(12) United States Patent
Liu et al.

(10) Patent No.: US 8,144,283 B2
(45) Date of Patent: Mar. 27, 2012

(54) CIRCUIT AND METHOD FOR REPAIRING A BROKEN LINE OF A FLAT PANEL DISPLAY DEVICE

(75) Inventors: Hongyu Liu, Beijing (CN); Ke Wang, Beijing (CN); Gang Wang, Beijing (CN); Xibin Shao, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 387 days.

(21) Appl. No.: 12/472,898

(22) Filed: May 27, 2009

(65) Prior Publication Data

US 2009/0296013 A1    Dec. 3, 2009

(30) Foreign Application Priority Data

May 30, 2008   (CN) .......................... 2008 1 0113974

(51) Int. Cl.
*G02F 1/1333*    (2006.01)
*G02F 1/13*       (2006.01)

(52) U.S. Cl. .......................... 349/54; 349/187; 349/192

(58) Field of Classification Search .................. None
See application file for complete search history.

(56) References Cited

U.S. PATENT DOCUMENTS

| 6,014,191 | A  | * | 1/2000  | Kim et al. ...................... 349/54 |
| 7,365,825 | B2 | * | 4/2008  | Kim .............................. 349/192 |
| 7,436,381 | B2 | * | 10/2008 | Kim et al. ...................... 345/87 |
| 7,724,314 | B2 | * | 5/2010  | Tanaka et al. .................. 349/54 |
| 2007/0139342 | A1 | * | 6/2007 | Lin et al. ........................ 345/98 |

\* cited by examiner

*Primary Examiner* — Rhonda Peace
(74) *Attorney, Agent, or Firm* — Ladas & Parry LLP

(57) ABSTRACT

The present invention relates to a circuit and a method for repairing a broken line of a flat panel display device. The circuit includes a second repairing line and a resistance access port is disposed on the second repairing line. The method includes: disposing a resistance access port on a second repairing line of the flat panel display device; and connecting a resistance meeting a display requirement to the resistance access port. The above solutions enable the circuit for repairing to adjust the load resistance so as to adjust the display effect by disposing the resistance access port; thereby improving the repairing effect and making the display quality of the repaired flat panel display device meet the requirement.

8 Claims, 5 Drawing Sheets

Prior Art

Prior Art

CIRCUIT AND METHOD FOR REPAIRING A BROKEN LINE OF A FLAT PANEL DISPLAY DEVICE

CROSS-REFERENCE TO RELATED APPLICATIONS

This application claims priority to Chinese Patent Application No. 200810113974.5, filed on May 30, 2008, entitled "Circuit and Method for Repairing a Broken Line of a Flat Panel Display Device", which is incorporated herein by reference in its entirety.

FIELD OF THE TECHNOLOGY

The present invention relates to a flat panel display device, particularly to a circuit and a method for repairing a broken line of the flat panel display device so as to improve display quality of the flat panel display device.

BACKGROUND

During manufacturing a flat panel display device, for the reason of process, a defect, especially a broken line defect, often occurs after a device is packaged.

Currently, in order to solve the problem of the broken line, a method for repairing the broken line that forming a circuit by means of laser welding is used. Taking a thin film transistor (TFT) liquid crystal display (LCD) as an example, as shown in FIG. 1 and FIG. 2, a broken line region 7 exists in an effective display region 2 on a glass substrate 1 before repairing. A first repairing line 3 is disposed on a scan line metal layer, and a second repairing line 5 is disposed on a signal line metal layer. The first repairing line 3 is located in the same layer with a repairing circuit of a driving circuit 6. The direction of an electric current 8 in the broken line region is shown as the dashed arrow in FIG. 1. The electric current is cut off at the broken line region 7, as a result of which there is no electric current passing through the lower part of the signal line 50 under the broken line region 7.

In a repairing process after a cell process, two ends of the signal line 50, where the broken line region 7 is located, overlap with active layers 4, and two ends of the second repairing line 5 overlap with active layers 4 are both melted to form melting regions 9 by using laser beams, so as to enable the signal line 50 to be connected with the first repairing line 3 and the second repairing line 5 and form a circuit that makes other parts of the metal line except the broken line region 7 be connected, as shown in FIG. 3 and FIG. 4. The laser melting regions 9 enable the electric current which should have passed through the upper half part 71 of the broken line region 7 to pass through the first repairing line 3, the driving circuit 6 and the second repairing line 5 along the direction of the dashed arrow and reach the lower half part 72 of the broken line region 7, which ensures that there is electric current passing through the parts of the signal line both above and under the broken line region 7, i.e., there is electric current passing through other parts of the signal line 50 except the broken line region 7.

However, in the circuit formed by this method, due to a load effect of resistances and capacitances on the driving circuit 6, the scan line metal layer and the first repairing line 3, delay phenomenon will occur on the signal, resulting in that the signals in the upper half and the lower half of the repaired metal line are different which may cause bad influence to the repairing effect.

SUMMARY

One aspect of the present invention is to provide a circuit and a method for repairing a broken line of a flat panel display device so as to improve the repairing effect and meet the requirement of the display quality of the repaired flat panel display device.

An embodiment of the present invention provides a circuit for repairing a broken line of a flat panel display device. The circuit includes a second repairing line and a resistance access port is disposed on the second repairing line.

In the above technical solution, the circuit for repairing may further include an adjustable resistance connected with the resistance access port. The circuit for repairing may further include a resistance with a resistance value of 10 kΩ-11 kΩ connected with the resistance access port. The circuit for repairing may further include a resistance with a resistance value of 19.5 kΩ-21 kΩ connected with the resistance access port.

In order to realize the above subject, an embodiment of the present invention further provides a method for repairing a broken line of a flat panel display device. The method includes: disposing a resistance access port on a second repairing line of the flat panel display device; and connecting a resistance meeting a display requirement to the resistance access port.

The step of connecting a resistance meeting a display requirement to the resistance access port may include: connecting an adjustable resistance to the resistance access port and adjusting the adjustable resistance until meeting the display requirement; or may include: connecting a resistance with a resistance value of 10 kΩ-11 kΩ to the resistance access port; or may include: connecting a resistance with a resistance value of 19.5 kΩ-21 kΩ to the resistance access port.

The above solutions enable the load resistance on the repairing circuit to be adjusted so as to adjust the display effect by disposing the resistance access port, thereby improving the repairing effect and making the display quality of the repaired flat panel display device meet the requirement.

The technical solution of the present invention will be further described in details through the following drawings and embodiments.

DETAILED DESCRIPTION

Figure 1:
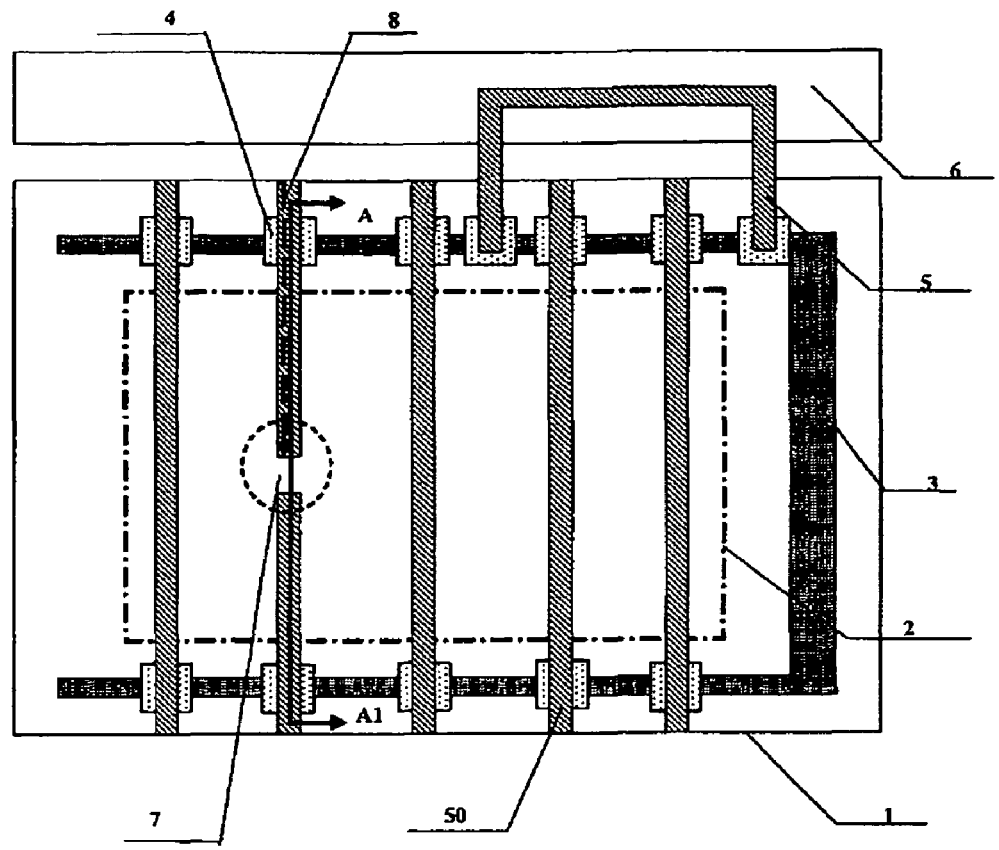
FIG. 1 is a schematic view showing a broken line region in a flat panel display device before being repaired.
Figure 2:
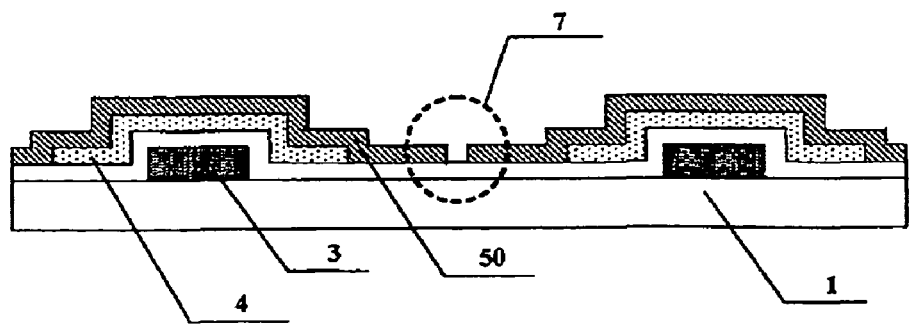
FIG. 2 is a cross-section view along a direction of A-A1 in FIG. 1.
Figure 3:
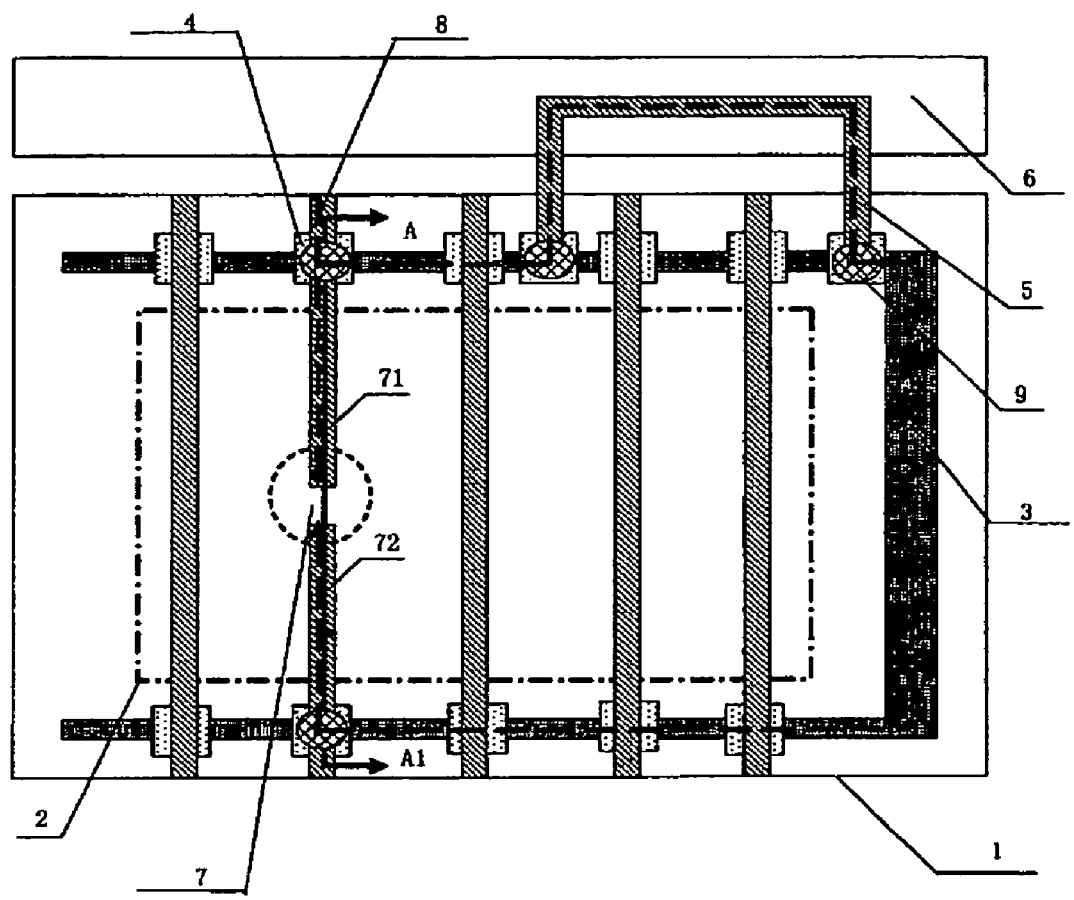
FIG. 3 is a schematic view showing a repair to a broken line in prior art.
Figure 4:
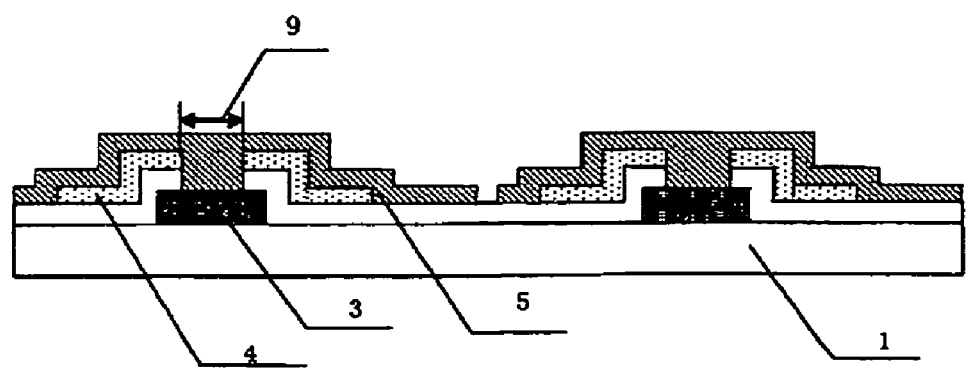
FIG. 4 is a cross-section view along a direction of A-A1 in FIG. 3.
Figure 5:
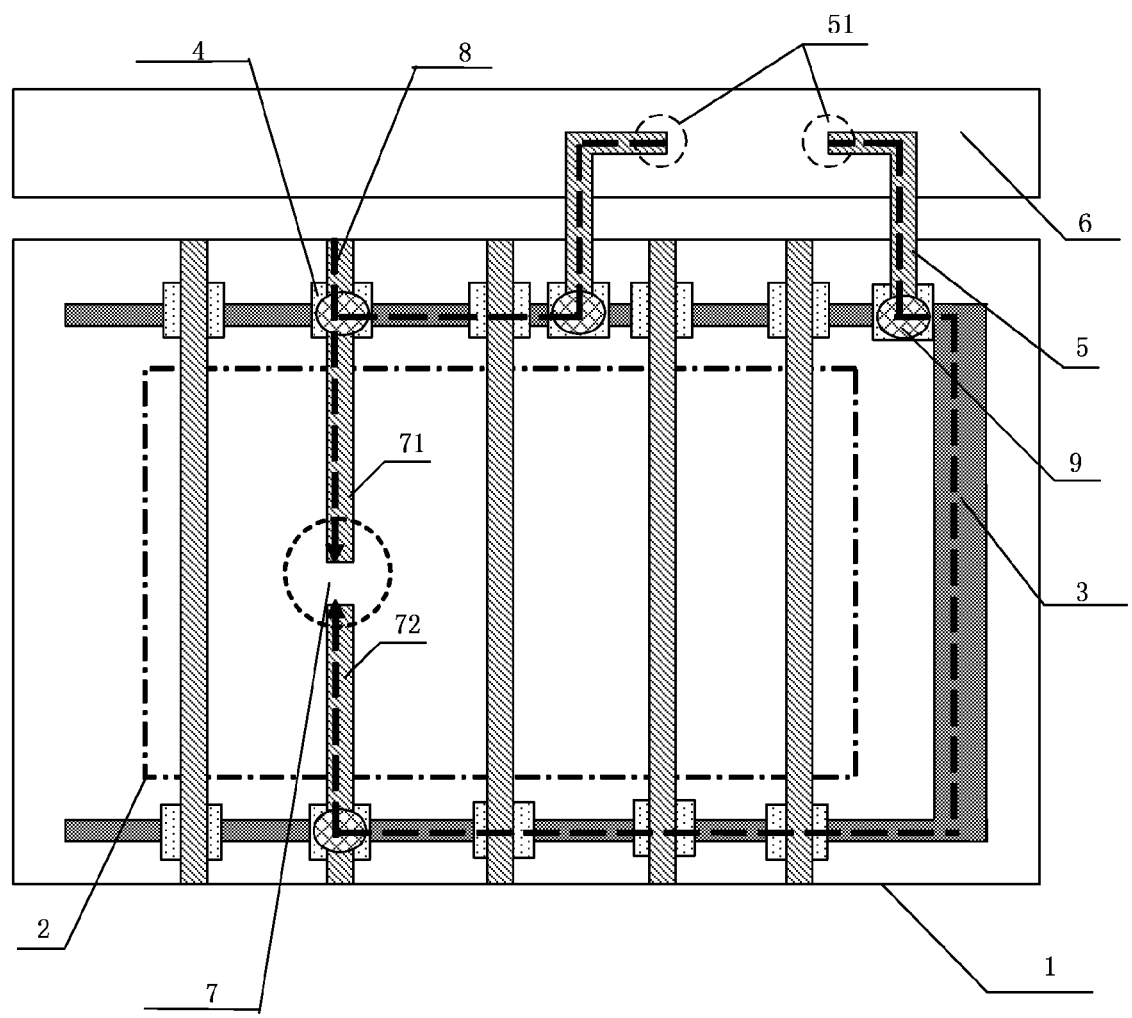
FIG. 5 is a schematic view showing a circuit for repairing a broken line of a flat panel display device in a first embodiment of the present invention.

FIG. 5 is a schematic view showing a circuit for repairing a broken line of a flat panel display device in a first embodiment of the present invention. The circuit for repairing the broken line includes a first repairing line 3 which belongs to a scan line metal layer, a second repairing line 5 and a resistance access port 51 disposed on the second repairing line 5. When there exists a broken line at the display device where the circuit for repairing the broken line of the present embodiment is located, two ends of a broken line region and two ends of the second repairing line 5 are melted by using a laser, that is, an active layer and a gate insulator layer between the signal line metal layer and the scan line metal layer are melted so as to make the signal line metal layer and the scan line metal layer become a short circuit and make the metal line on the display device connected together with the circuit for repairing in a driving circuit 6. A resistance may be connected to the resistance access port 51, and then observing the display effect of an image region where the broken line region 7 of the display device is located. If the display effect is not desirable, the resistance at the resistance access port 51 may be adjusted until the display effect can meet the requirement. Therefore, by using the resistance access port 51, the present embodiment can enable the load in the circuit for repairing to be adjusted according to the display effect after repairing the broken line so as to improve the repairing effect and make the repaired display device meet the need of display.

In the above embodiment, a resistance value of the resistance connected to the resistance access port 51 in the circuit for repairing the broken line varies depending on different positions of the broken line region 7.

Figure 6:
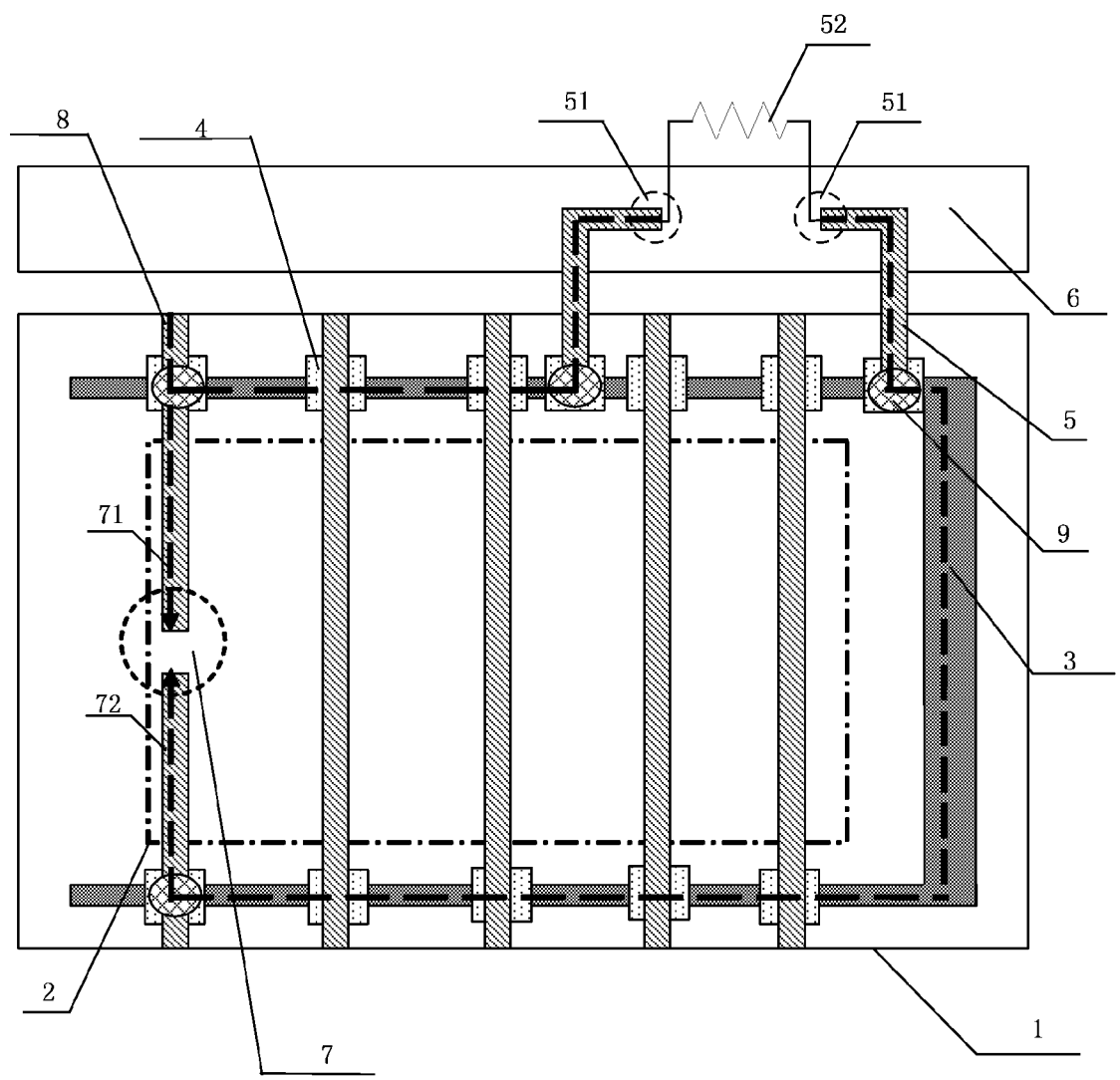
FIG. 6 is a schematic view showing a circuit for repairing a broken line of a flat panel display device in a second embodiment of the present invention.

FIG. 6 is a schematic view showing a circuit for repairing the broken line of a flat panel display device in a second embodiment of the present invention. The broken line region 7 is relatively far from the second repairing line 5 and the resistance value of a resistance 52 connected to the resistance access port 51 is smaller, which may be 10 k$\Omega$-11 k$\Omega$. In the present embodiment, the circuit for repairing the broken line further includes the resistance 52 with a resistance value of 10.5 k$\Omega$, which can meet the requirement of the circuit for repairing with a low load.

Figure 7:
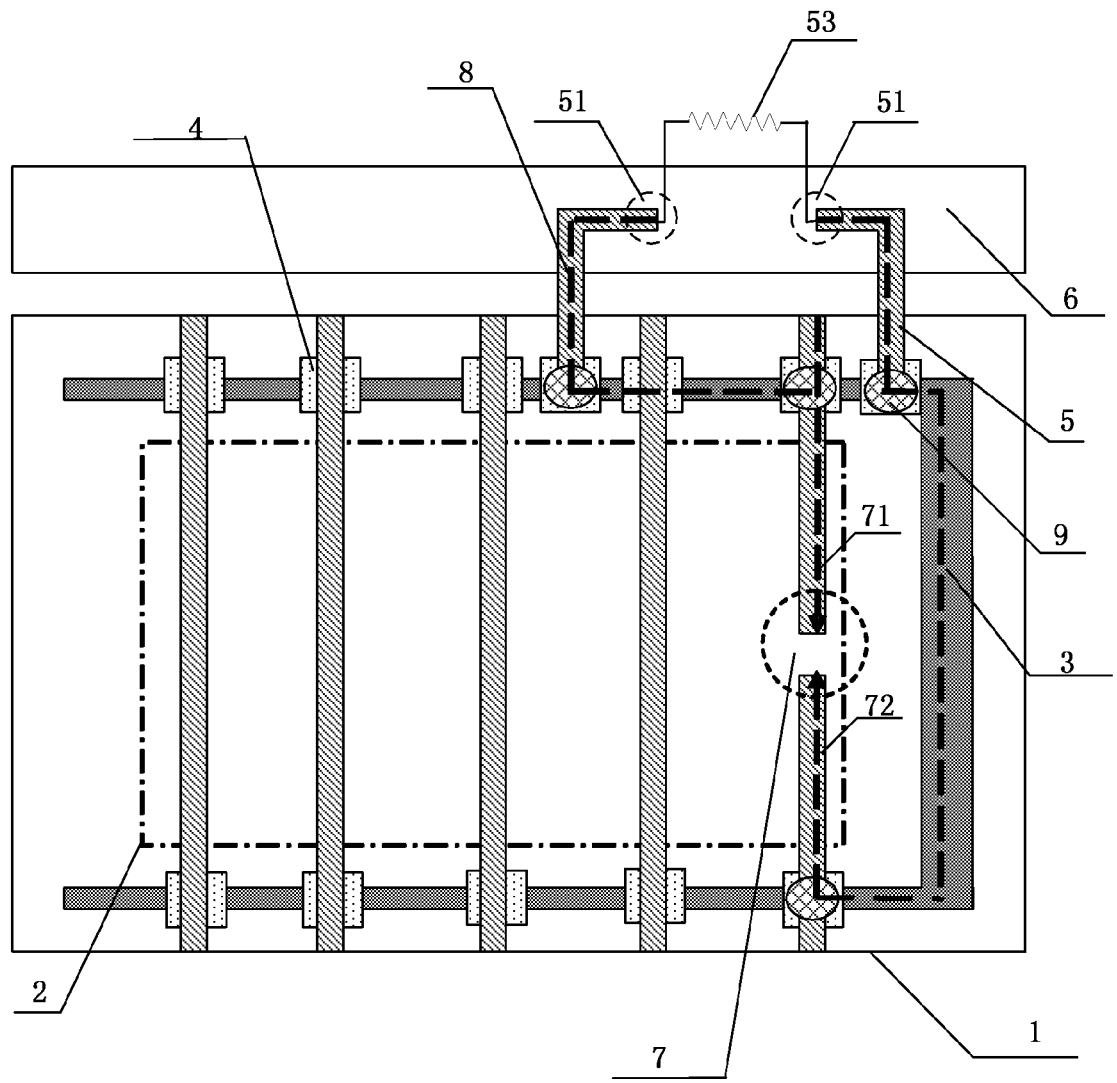
FIG. 7 is a schematic view showing a circuit for repairing a broken line of a flat panel display device in a third embodiment of the present invention.

FIG. 7 is a schematic view showing a circuit for repairing a broken line of a flat panel display device in a third embodiment of the present invention. The broken line region 7 is close to the second repairing line 5 and a resistance value of a resistance 53 connected to the resistance access port 51 is larger, which may be 19.5 k$\Omega$-21 k$\Omega$. In the present embodiment, the circuit for repairing the broken line further includes the resistance 53 with a resistance value of 20 k$\Omega$, which can meet the requirement of the circuit for repairing with a high load.

In the above embodiment, the resistance 52 and the resistance 53 can be replaced by an adjustable resistance so as to enable the circuit for repairing the broken line of the flat panel display device to meet various load requirements flexibly and improve repairing convenience greatly.

Figure 8:
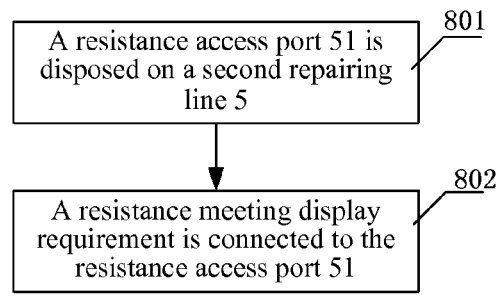
FIG. 8 is a flow chart showing a method for repairing a broken line of a flat panel display device in an embodiment of the present invention.

FIG. 8 is a flow chart showing a method for repairing a broken line of a flat panel display device in an embodiment of the present invention. The method includes the following steps:

In step 801, a resistance access port 51 is disposed on a second repairing line 5 of a flat panel display device.

In step 802, when there is a broken line region 7 in the circuit of the display device, a resistance which can meet the display requirement is connected to the resistance access port 51. Specifically, an adjustable resistance may be connected to the resistance access port 51, which is adjusted to make the load meet the repairing requirement. Alternatively, when the broken line region 7 is relatively far from the second repairing line 5, a resistance with a resistance value of 10 k$\Omega$-11 k$\Omega$ is connected to the resistance access port 51; and when the broken line region 7 is close to the second repairing line 5, a resistance with a resistance value of 19.5 k$\Omega$-21 k$\Omega$ is connected to the resistance access port 51.

In the above embodiment of the method, the circuit for repairing can adjust the load by being provided with the resistance access port 51 so as to improve the display quality and meet the repairing requirement.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the scope of the present invention and covered in the claims of the present invention.

What is claimed is:

1. A circuit for repairing a broken line of a flat panel display device, comprising a first repairing line and a second repairing line disposed in different layers,
   wherein, the first repairing line is disposed at the periphery of an effective display region, has overlapped parts with two ends of a signal line and is connectable with the two ends of the signal line by welding; two ends of the second repairing line are overlapped with the first repairing line, and the second repairing line is connectable with the first repairing line in parallel,
   wherein, a resistance access port is disposed on the second repairing line.

2. The circuit according to claim 1, further comprising an adjustable resistance connected to the resistance access port.

3. The circuit according to claim 1, further comprising a resistance with a resistance value of 10 k$\Omega$-11 k$\Omega$ connected to the resistance access port.

4. The circuit according to claim 1, further comprising a resistance with a resistance value of 19.5 k$\Omega$-21 k$\Omega$ connected to the resistance access port.

5. A method for repairing a broken line of a flat panel display device, the flat panel display device comprising a circuit for repairing the broken line, the circuit comprising a first repairing line and a second repairing line disposed in different layers; the first repairing line being disposed at the periphery of an effective display region, having overlapped parts with two ends of a signal line and being connectable with the two ends of the signal line by welding; two ends of the second repairing line being overlapped with the first repairing line, and the second repairing line being connectable with the first repairing line in parallel,
   the method comprising:
   disposing a resistance access port on the second repairing line of the flat panel display device; and
   connecting a resistance meeting a display requirement to the resistance access port.

6. The method according to claim 5, wherein the step of connecting a resistance meeting a display requirement to the resistance access port comprises: connecting an adjustable resistance to the resistance access port and adjusting the adjustable resistance until meeting the display requirement.

7. The method according to claim 5, wherein the step of connecting a resistance meeting a display requirement to the resistance access port comprises: connecting a resistance with a resistance value of 10 kΩ-11 kΩ to the resistance access port.

8. The method according to claim 5, wherein the step of connecting a resistance meeting a display requirement to the resistance access port comprises: connecting a resistance with a resistance value of 19.5 kΩ-21 kΩ to the resistance access port.

* * * * *